US010253739B2

(12) United States Patent
Filippi et al.

(10) Patent No.: US 10,253,739 B2
(45) Date of Patent: Apr. 9, 2019

(54) FUEL INJECTION VALVE FOR AN INTERNAL COMBUSTION ENGINE

(71) Applicant: Continental Automotive GmbH, Hannover (DE)

(72) Inventors: Stefano Filippi, Castel'Anselmo Collesalvetti (IT); Mauro Grandi, Leghorn (IT); Francesco Lenzi, Leghorn (IT); Valerio Polidori, Leghorn (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 38 days.

(21) Appl. No.: 14/827,173

(22) Filed: Aug. 14, 2015

(65) Prior Publication Data
US 2016/0102640 A1    Apr. 14, 2016

(30) Foreign Application Priority Data

Oct. 13, 2014   (EP) .................................... 14188642

(51) Int. Cl.
*F02M 51/06* (2006.01)
*F16K 31/06* (2006.01)

(52) U.S. Cl.
CPC .... *F02M 51/0689* (2013.01); *F02M 51/0653* (2013.01); *F16K 31/0675* (2013.01);
(Continued)

(58) Field of Classification Search
CPC ........... F02M 51/0625; F02M 51/0635; F02M 51/0642; F02M 51/061; F02M 51/0614;
(Continued)

(56) References Cited

U.S. PATENT DOCUMENTS 5,091,024 A * 2/1992 DeBold .................. C22C 38/22
148/306
5,188,336 A * 2/1993 Graner ............... F02M 51/0614
239/585.3
(Continued)

FOREIGN PATENT DOCUMENTS

| CN | 102405344 A | 4/2012 | ............. F02M 51/06 |
| CN | 102652219 A | 8/2012 | ............. F02M 51/06 |
| EP | 2733401 A1 | 5/2014 | ............. F02M 63/00 |
| EP | 2863043 A1 | 4/2015 | ............. F02M 51/06 |
| JP | 2005307751 A | 11/2005 | ............. F02M 51/06 |
| JP | 2010053812 A | 3/2010 | ............. F02M 47/00 |

OTHER PUBLICATIONS

European Search Report, Application No. 14188642.4, 6 pages, dated Mar. 27, 2015.
Chinese Office Action, Application No. 201510669035.9, 11 pages, dated Jul. 21, 2017.

*Primary Examiner* — Steven J Ganey
*Assistant Examiner* — Tuongminh N Pham
(74) *Attorney, Agent, or Firm* — Slayden Grubert Beard PLLC

(57) ABSTRACT

A fuel injection valve includes a housing with a cavity, a valve needle, an actuator including a magnetic coil arranged in a coil casing, and an armature in the cavity. The housing includes a separation ring positioned between the armature and the coil casing and configured to lead the electromagnetic flux to the armature. The separation ring includes a first part and a second part. The first part is made of a first material and the second part is made of second material that differs from the first material. The first material and the second material are magnetic materials.

19 Claims, 4 Drawing Sheets

(52) U.S. Cl.
CPC ..... *F02M 2200/08* (2013.01); *F02M 2200/16* (2013.01); *F02M 2200/20* (2013.01); *F02M 2200/9053* (2013.01)

(58) Field of Classification Search
CPC ........... F02M 51/0617; F02M 2200/16; F02M 61/10; F02M 61/08; F02M 61/04; F02M 51/0671; F02M 51/0603; F02M 51/066; F02M 51/0685; F16K 31/08; F16K 31/082; F16K 31/084; Y10S 239/90; B05B 1/1663; B05B 1/3013; B05B 1/3026; H01F 7/1646; H01F 7/122; H01F 7/121

USPC ........... 239/584–585.1, 583; 251/129.21, 65; 137/625.25; 335/229, 220
See application file for complete search history.

(56) References Cited

U.S. PATENT DOCUMENTS

| | | | | |
|---|---|---|---|---|
| 5,238,224 | A | * | 8/1993 | Horsting .............. F02M 51/005 239/585.3 |
| 5,718,264 | A | * | 2/1998 | Sturman ............. F15B 13/0405 137/625.65 |
| 5,961,045 | A | * | 10/1999 | Coldren ............... F02M 57/023 239/585.2 |
| 8,919,372 | B2 | | 12/2014 | Fischetti et al. ........... 137/514.7 |
| 9,316,191 | B2 | | 4/2016 | Grandi |
| 2003/0178509 | A1 | | 9/2003 | Porter ........................ 239/585.1 |

* cited by examiner

FUEL INJECTION VALVE FOR AN INTERNAL COMBUSTION ENGINE

CROSS-REFERENCE TO RELATED APPLICATIONS

This application claims priority to EP Application No. 14188642.4 filed Oct. 13, 2014, the contents of which are hereby incorporated by reference in their entirety.

TECHNICAL FIELD

The invention relates to a fuel injection valve for an internal combustion engine.

BACKGROUND

Fuel injection valves which operate electromagnetically are well known. With the aid of a magnetic coil which is chargeable by electricity to generate a magnetic flux, a magnetisable armature which may be combined with a valve needle, will be stimulated for movement. Normally, the movement is an axial movement along a valve needle axis of the valve needle.

When the valve needle and the armature are coupled, the valve needle starts moving due to the movement of the armature. Depending on the direction of the movement, a nozzle orifice may be opened with the aid of the valve needle. In order to seal the nozzle orifice when the magnetic coil is not energized, a valve spring is positioned in the fuel injection valve, which urges the valve needle against the nozzle orifice. This means, that the valve needle has to be moved by the aid of the armature against the spring force of the valve spring, when the nozzle orifice is to be opened. When the nozzle orifice is open, a fuel quantity, positioned in the fuel injection valve, may flow through the nozzle orifice into a combustion chamber, normally a combustion chamber of an internal combustion engine.

A combustion process of the internal combustion engine depends among several other criteria, e.g. fuel quantity or fuel temperature or fuel pressure—on the opening and closing of the nozzle orifice. Therefore, an exactly defined opening and closing of the nozzle orifice are very important for reaching an advantageous power rate, fuel consumption and/or emissions of the internal combustion engine.

The magnetic coil may be arranged in a u-shaped coil casing, while the open end of the coil casing may be positioned vis-a-vis of the armature. To achieve a separation of the magnetic coil from the fluid path, a separation disc or separation ring which separates the actuator from the fuel path may be arranged between the armature and the coil casing.

US 2003/0178509 A1 teaches a fuel injection valve comprising a flux washer between the coil casing an the armature. The separation ring provides a magnetic path between an outer casing of the fuel injection valve and an inlet tube. It is made out of a ferritic material.

SUMMARY

One embodiment provides a fuel injection valve for an internal combustion engine, comprising: a housing, the housing having a cavity which hydraulically connects a fluid inlet tube with a nozzle orifice, a valve needle being movably positioned in the cavity for opening and closing the nozzle orifice, and an actuator comprising a magnetic coil being arranged in a coil casing and an armature being movably positioned cavity and being mechanically coupled to the valve needle for initiating the movement of the valve needle in dependence of a magnetic flux initiated by the magnetic coil, wherein the housing comprises a separation ring being positioned between the armature and the coil casing and being configured to lead the electromagnetic flux to the armature, the separation ring comprises a first part and a second part, the first part is made of a first material and the second part is made of second material which differs from the first material, and the first material and the second material are magnetic materials.

In a further embodiment, the first material is ferromagnetic material and the second material is a permanent magnetic material.

In a further embodiment, the coil is hydraulically separated from the cavity by the housing, and the second part of the separation ring is arranged between the first part and the coil so that the first part hydraulically separates the second part from the cavity.

In a further embodiment, the first material comprises Cr and/or C and/or Mn and/or Si and/or P and/or S.

In a further embodiment, the first material comprises 16-18% Cr and/or less than 0.12% C and/or less than 1% Mn and/or less than 1% Si and/or less than 0.04% P and/or less than 0.03% S.

In a further embodiment, the first part has a recess in which the second part is arranged.

In a further embodiment, the second recess is positioned adjacent to the coil casing.

In a further embodiment, the second recess is positioned adjacent to the magnetic coil.

In a further embodiment, the second part is radially magnetized.

In a further embodiment, the second recess is a circular groove.

BRIEF DESCRIPTION OF THE DRAWINGS

Example embodiments of the invention are explained below with reference to the drawings, in which.

DETAILED DESCRIPTION

Figure 1:
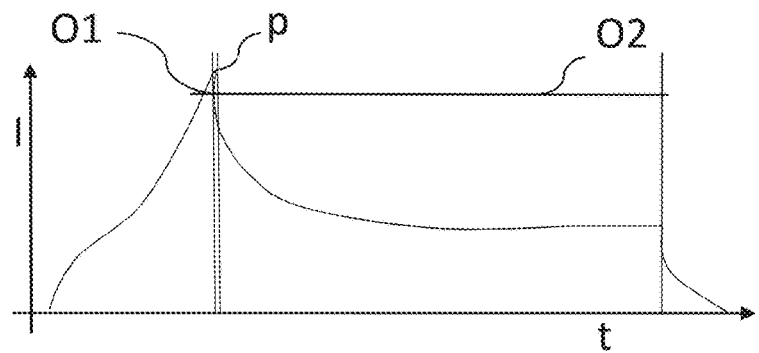
FIG. 1 shows a typical I-t-diagram of a fuel injection valve.

Embodiments of the invention provide an improved fuel injection valve.

A fuel injection valve for an internal combustion engine is disclosed. The fuel injection valve may be provided for a fuel injection assembly of the internal combustion engine.

The fuel injection valve comprises a housing and a valve needle. In one embodiment, the housing has a first housing portion and a second housing portion. The first and second housing portions are in particular subsequently arranged in direction of a longitudinal axis of the housing.

The housing has a cavity which hydraulically connects a fluid inlet tube of the fuel injection valve to a nozzle orifice of the fuel injection valve. In particular, fuel enters the fuel injection valve through the fluid inlet tube and is dispensed from the fuel injection valve through the nozzle orifice. The first housing portion may have a first recess which is in particular a portion of the cavity. The first recess may comprise the nozzle orifice which is expediently positioned at a downstream end of the recess. Fuel which is positioned in the recess may flow out of the nozzle orifice.

The valve needle is movably received in the cavity for opening and closing the nozzle orifice.

The fuel injection valve further comprises an actuator which comprises a magnetic coil and an armature. The coil is expediently hydraulically separated from the cavity by the housing. In one embodiment, the actuator is positioned in the second housing portion. The actuator activates the moving of the valve needle due to an electric current which initiates a magnetic flux of the magnetic coil. The magnetic coil is arranged in a coil casing which may be positioned circumferentially around the second housing portion.

The armature is positioned in the cavity and movable relative to the housing. Movement of the armature is effected by means of the magnetic flux. The armature is mechanically coupled to the valve needle so that it can initiate movement of the valve needle, in particular away from a closing position of the valve needle.

In one embodiment, a valve spring is positioned in the cavity, for example in the second housing portion, for urging the valve needle against a valve seat for preventing fuel flow through the nozzle orifice in a closing position of the valve needle.

Furthermore the housing comprises a separation ring. The separation ring is at least partially arranged between the armature and the coil casing, in particular in axial direction. It is configured to lead the electromagnetic flux or, respectively, the magnetic field to the armature. This means, the separation ring is in a magnetic circuit of the fuel injection valve.

The magnetic circuit is in particular established at least by the magnetic coil, the housing, the separation ring and the armature. For example, the magnetic flux enters into the cavity of the housing through the separation ring. Preferably, the separation ring contributes to shaping the magnetic field.

The separation ring comprises a first part and a second part, wherein the first part is made of a first material and the second part is made of a second material which differs from the first material. Both materials are magnetic materials with different magnetic properties.

This configuration provides an improved magnetic performance of the injection valve. Moreover, the fuel can easily be separated from the coil in order to prevent external leakage. Furthermore, a force of the coil on the armature can be particularly large due to the shaping of the magnetic field by means of the separation ring so that the fuel injection valve may be operable to work with particularly high fuel pressures.

The separation ring advantageously contributes to the sealing of the magnetic coil against the fuel. On the other hand, it is particularly resistant with respect to stress. It may be advantageously operable to limit a radial leakage of the magnetic flux In an embodiment, the first material is a ferromagnetic material and the second material is a permanent magnetic material. By means of the permanent magnetic material, the magnetic flux in the magnetic circuit can be given a particularly advantageous shape by means of the separation ring.

In one embodiment, the second part of the separation ring is arranged between the first part and the coil so that the first part hydraulically separates the second part from the cavity. In other words, the first part of the separation ring is a portion of a fluid tight wall of the housing which defines the cavity. The second portion is arranged on the side of the wall remote from the cavity and in particular facing towards the coil. In this way, the second portion which preferably comprises the permanent magnetic material is not in contact with the fuel in the cavity. Thus, the risk that the permanent magnetic material is damaged due to chemical reactions with the fuel is particularly small.

In a further embodiment, the first material comprises chrome and/or carbon and/or manganese and/or silicium and/or phosphor and/or sulfur. By this, a ferromagnetic material is achievable, which is compatible with gasoline. Preferably, the composition of the first material comprises 16-18% chrome and/or less than 0.12% carbon and/or less than 1% manganese and/or less than 1% silicium and/or less than 0.04% phosphor and/or less than 0.03% sulfur.

In a further embodiment, the first part has a recess in which the second part is arranged. This configuration provides a simple and space saving shape of the separation ring, because the second part may be embedded in the first part. So a plane surface facing toward the coil casing can be realized, which is easy to manufacture and handle.

In a further embodiment, the recess is positioned adjacent to the coil casing and/or to the magnetic coil. The position adjacent to the coil casing means, that the second part is arrangeable in a so called dry section of the armature. The fuel injection valve comprises a dry and a wet section. The wet section is defined by the cavity and configured to guide fuel through the fuel injection valve. The needle and the armature are arranged in the wet section. The magnetic coil and the coil casing are arranged in the dry section. The wet section is separated from the dry section at least by the separation ring. Due to the positioning of the second recess adjacent to the coil casing in the dry section, the second part is separated from the wet section. So even material which is not compatible with the fuel can be used as the permanent magnetic material. The permanent magnetic material has preferably stable material properties in a temperature range over −40° C. to 150° C., which is the typical temperature range for automotive applications.

In a further embodiment, the second part is radially magnetized. The advantage of the embodiment is to realize a radial magnetic flux in the first part, in particular by means of the permanent magnetic material. In particular, the radial magnetic flux in the first part may be saturated due to the flux generated by the second part. Therefore, the radial portion of the magnetic flux which is generated by the coil is particularly small and in turn, the axial portion of the magnetic flux which penetrates the separation ring and generates the magnetic force on the armature is particularly large. In this way, a particularly large force or impulse can be transferred to the valve needle for opening the needle orifice.

In a further embodiment, the recess of the first part is a circular groove, i.e. a groove which extends circumferentially around a central axis—which is in particular coaxial with the longitudinal axis of the housing—along an imaginary circular center line. Therefore the second part can be easily manufactured as a ring and the recess can be produced cost-efficiently, i.e. by a milling process.

FIG. 1 shows a typical I-t-diagram of a fuel injection valve 10.

A magnetic force which is realized by an electric current I has to be strong enough to hold an outward opening valve needle 14 during a specific time t. The electric current I creates a magnetic flux 42 in an armature 32 of the fuel injection valve 10. With the help of this magnetic flux 42 the nozzle orifice 22 has to be opened at a specific time and also has to be closed at a specific time. This means, that the magnetic flux 42 or the magnetic field in the armature 32 has to be cancelled at the specific time so that the nozzle orifice 22 is closed. The electric current which is applied to the magnetic coil 34 can be reduced over an opening phase of the nozzle orifice 22, e.g. to reduce magnetic sticking due to remanescent magnetism when the electric current turned off. The electric current reaches a peak p in a first opening phase O1 and after reaching the peak p it is reduced to a "hold" value in the following second opening phase O2. Now in the second opening phase O2, the magnetic force created in the armature 32 has to be strong enough to hold the valve needle 14 in its opening position.

Figure 2:
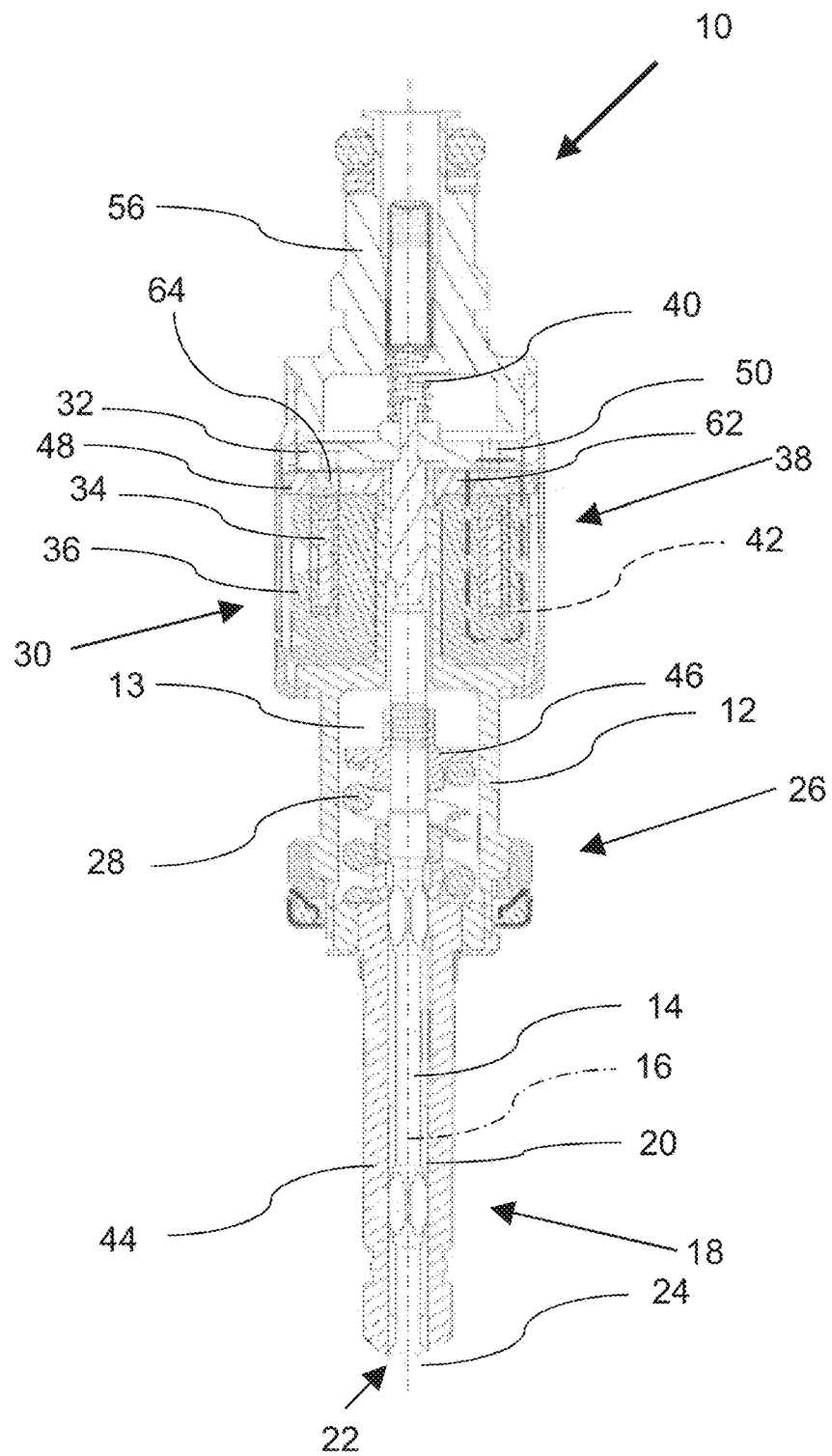
FIG. 2 shows a fuel injection valve in a longitudinal section.

FIG. 2 shows a currently unclaimed fuel injection valve 10 with an outward opening injector for an internal combustion engine. The fuel injection valve 10 comprises a housing 12 having a cavity 13, in which a valve needle 14 with a needle axis 16 is movably arranged. The valve needle axis 16 is also a central longitudinal axis of the housing 12.

The valve needle 14 is movably arranged in the housing 12, received in a first recess 20 of a first housing portion 18 of the housing 12. A nozzle orifice 22 of the first recess 20 being positioned at a downstream end of the first recess 20 has to be opened or closed by a needle tip 24 of the valve needle 14.

A second housing portion 26 of the housing 12 is arranged axially adjacent to the first housing portion 18 A valve spring 28 is received in the second housing portion 26. This valve spring 28 is partially surrounding the valve needle 14. The valve spring 28 is precompressed to bias the valve needle 14 in a closing position where it is in contact with a valve seat to seal the nozzle orifice 22. When an electric current is applied to a magnetic coil 34 of the electromagnetic actuator 30, the valve needle 14 is displaced away from the closing position by the electromagnetic actuator 30 against the spring force of the valve spring 28.

The magnetic coil 34, engaged by a coil casing 36, is positioned circumferentially around a third housing portion 38 of the housing 12. The third housing portion 38 is axially adjacent to the second housing portion 26, so that the second housing portion 26 is arranged between the first housing portion 18 and the third housing portion 38.

The third housing portion 38 comprises, in the cavity 13, a calibration spring 40 for calibrating the fuel injection valve 10.

A shaft 44 of the valve needle 14 is cylindrically formed and guides the valve needle 14. It is shaped in such fashion that the fuel may pass the valve needle 14 when it flows through the cavity 13.

A washer 46 is placed in the second housing portion 26 for supporting the valve spring 28. The washer 46 is fixed to the valve needle 14 in an i.e. welded or in a crimped manner.

The housing 12 comprises a separation ring 48 which is arranged between the coil housing 36 and the armature 32. The armature 32 has at least two openings 50, so that fuel may axially pass the armature 32. The separation ring 48 is shown in detail in FIG. 3.

A main extension plane of the separation ring 48 is perpendicular to the needle axis 16. So in other word, a central axis of the separation ring 48 is parallel or coaxial to the needle axis 16. The separation ring 48 has to separate the magnetic coil 34 and the coil casing 36 from the cavity 13. In other words, it acts as a sealing device and contributes to separate a wet section of the fuel injection valve 10 from a dry section of the fuel injection valve 10.

The dry section is delimited by the coil casing 36 and the separation ring 48 on the side remote from the cavity 13. The coil casing 36 has a u-shaped cross-section and surrounds a first tubular section 52 of the housing 12. Coaxially to the needle axis 16, a pin 54 is arranged in the first tubular section 52 which is in form-fit connection with the valve needle 14 on its one end. On its other end, it is in contact with the armature 32 and is fixed to the armature 32.

At a second longitudinal end of the fuel injection valve 10, remote from the nozzle orifice 22, a fluid inlet tube 56 is arranged adjacent to the upper side of the coil casing 36. Via the fluid inlet tube 56, the fuel injection valve 10 can be connected to a pipe system and to a high-pressure pump. The high pressure pump is configured to pressurize the fuel and provide it to the fuel injection valve 10.

Fuel coming from the high pressure pump is pumped through the fluid inlet tube 56 into the housing 12. A fluid filter is arranged in the fluid inlet tube. The fluid, in particular the fuel, passes the calibration spring 40 and flows through the openings 50 of the armature 32, through the first tubular section 52 and passes the valve spring 28. When the nozzle orifice 22 is open, the fuel passes the nozzle orifice 22 and is injected to the combustion chamber.

One task of the separation ring 48 is to seal the magnetic coil 34 from contact with fuel. Therefore, the separation ring 48 is a part of a fuel channel which is represented by the cavity 13 and shaped by the housing 12. This fluid channel is this channel where the fluid may flow through the housing 12 from the fluid inlet tube 56 to the nozzle orifice 22.

The opening and closing of the nozzle orifice 22 is controlled by the actuator 30. A not shown control device provides electric energy to the magnetic coil 34 and the magnetic coil 34 generates the magnetic flux 42. The magnetic flux 42 penetrates the separation ring 48 and interacts with the armature 32. It is a further task of the separation ring 48 to guide and/or shape the magnetic flux in the region between the coil 34 and the armature 32.

The armature 32 is attracted by the magnetic flux 42 in the direction towards the magnetic coil 34. A magnetic force is produced by interacting with the armature 32 so that the armature 32 moves down in the direction of the separation ring 48. Because the pin 54 is fixed to the armature 32 on its one end and is connected to the valve needle 14 on its other end, the valve needle 14 moves down in the direction of the combustion chamber and the nozzle orifice 22 is opened.

In the area of the armature 32 and the coil casing 36, the fluid may flow through the openings 50 to an inner orifice 58 of the first tubular section 52 which is axially guiding the pin 54. The pin 54, fixed to the armature 32, is movable positioned in the first tubular section 52. On its way to the nozzle orifice 22, the fluid passes an area between the pin 54 and the inner orifice 58.

Figure 3:
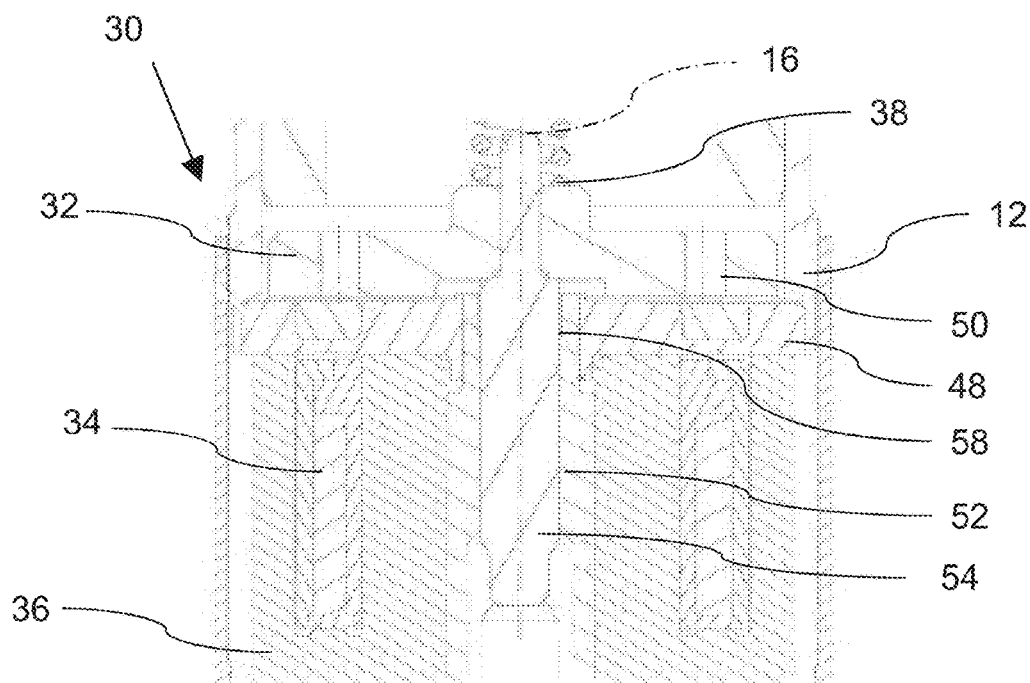
FIG. 3 shows a separation ring of the fuel injection valve shown in FIG. 2 in detail.

In FIG. 3, the separation ring 48 of the fuel injection valve 10 according to FIG. 2 is shown in a more detailed view. The separation ring 48 consists of two parts made from different materials. The first part 62 is from a magnetic material and the second part 64 is made of a non-magnetic material. Due to the non-magnetic material of the second part 64, efficiency losses due to radial magnetization of the separation ring 48 have to be compensated by a relatively large magnetic flux generation of the coil 34 for achieving a sufficient magnetic force between the magnetic coil 34 and the armature 32.

Figure 4:
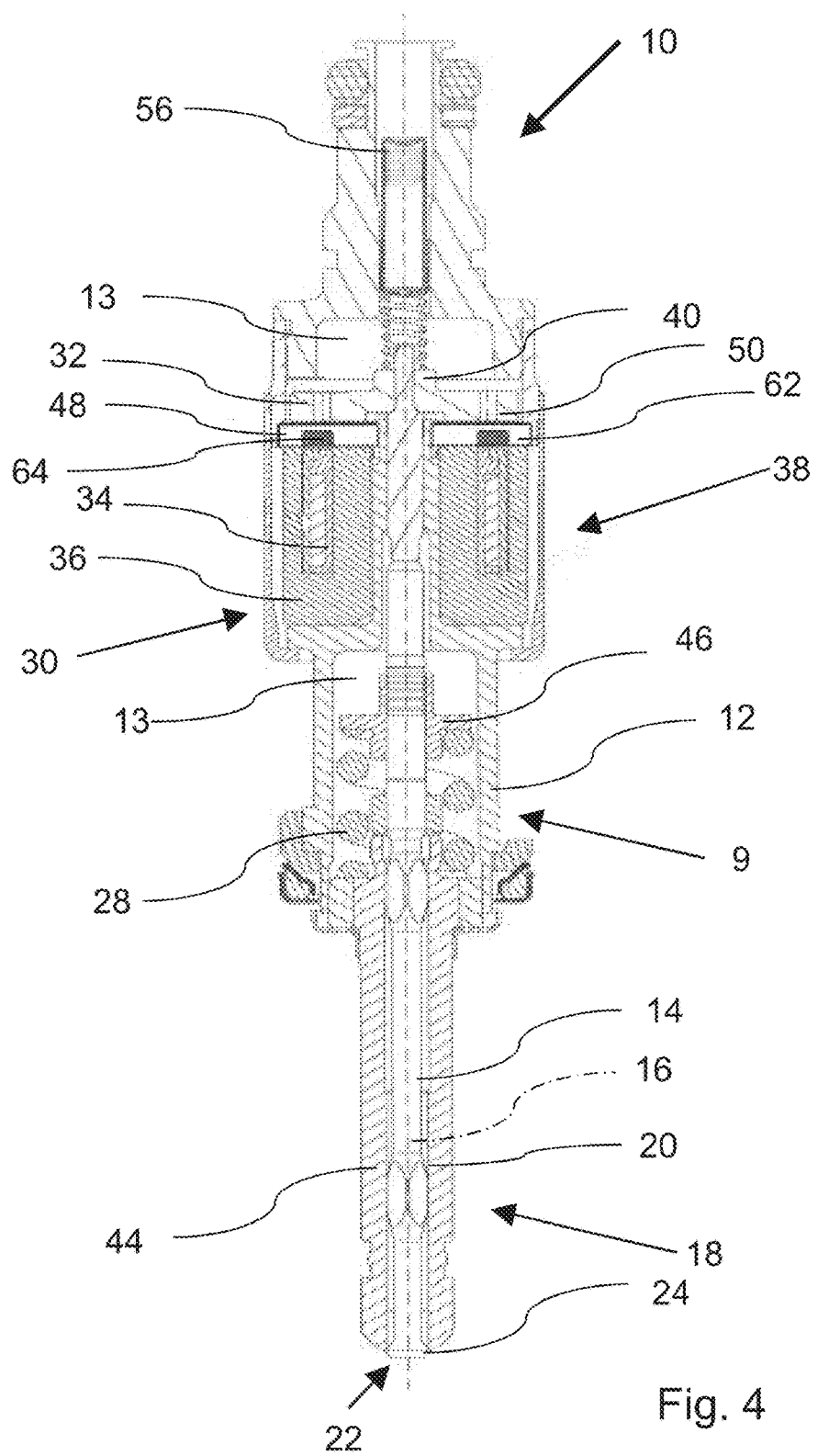
FIG. 4 shows a fuel injection valve in a longitudinal section according to an exemplary embodiment of the invention.

FIG. 4 shows a fuel injection valve 10 in a longitudinal section according to an exemplary embodiment of the invention with a separation ring 38 in a first embodiment which is formed like a disc. The fuel injection valve 10 corresponds in general with that described above in connection with FIGS. 2 and 3 and only features which are different are discussed below in more detail.

Figure 5:
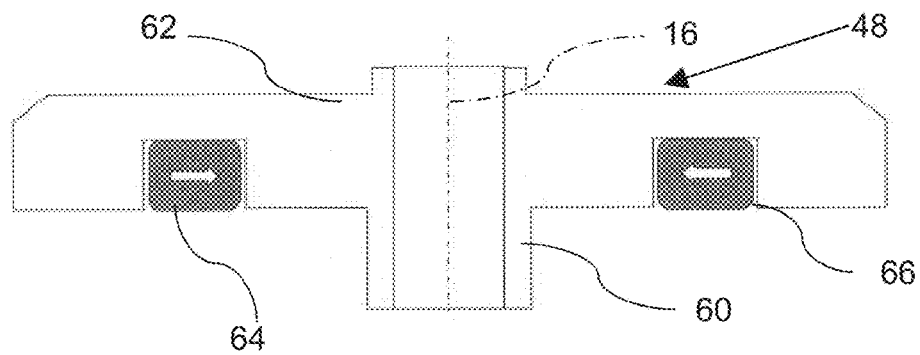
FIG. 5 shows a separation ring in a longitudinal section of the fuel injection valve shown in FIG. 4.

FIG. 5 shows the separation ring 48 in a longitudinal section in an alternative, second embodiment for the fuel injection valve 10. In this case, the separation ring 38 is formed like a disc, supported by a short bush 60 which is arranged in the first tubular section 52.

The separation ring 48 in the first embodiment and the second embodiment comprises a first part 62 and a second part 64. The second part 64 is arranged in a recess 66 of the first part 62.

The recess 66 is positioned adjacent to the coil casing 36 and in particular adjacent to the magnetic coil 34. Preferable it is positioned remote from the cavity 13 relative to the first part 62. It is hydraulically separated from the cavity 13 by means of the first part 62.

The second recess 66 is formed like a circular groove so the second part 64 is formed like a ring. This is a simple design which is easy to manufacture.

The first part 62 is made from a first material and the second part 64 is made from a second material wherein both materials are magnetic materials. The first material is a ferromagnetic material and the second material is a permanent magnetic material.

Because of the first part 62 has contact with the fluid, especially the fuel and particularly with regard to gasoline and accordingly petrol, the first part 62 has to be compatible with the fluid. So the first material comprises chrome Cr and/or carbon C and/or manganese Mn and/or silicium Si and/or phosphor P and/or sulfur S. In example, the material is a stainless steel having the SAE steel grade 430.

The second part 64 has—due to its position—no contact with the fluid, therefore no special provisions have to be considered except its temperature behaviour. Both materials have to be consistent over the temperature range of –40° C. to 150° C.

The second part 64 is composed, for example, of plasto neodymium with 8 to 10 MOe (Oersted). It is radially magnetized, i.e. the magnetic north pole and the magnetic south pole follow one another in radial direction (roughly indicated by the bold arrows within the second part 64 in FIG. 5). The second part 64 is preferable bonded to the first part 62.

Figures 6, 7, 8:
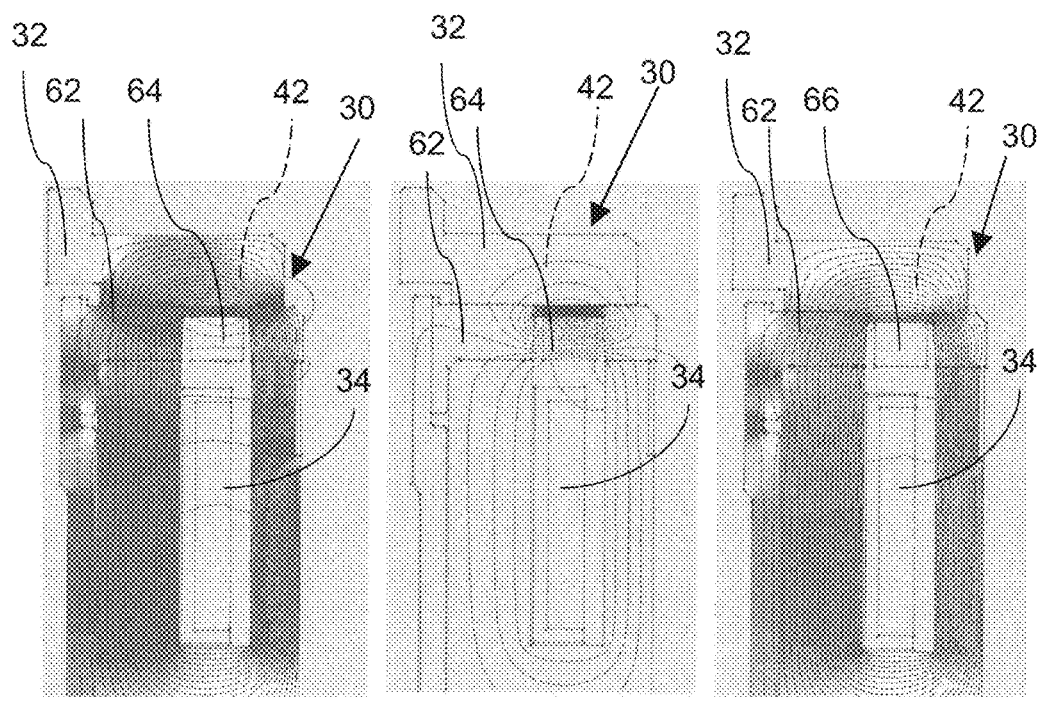
FIG. 6 shows a magnetic flux of an actuator without an electric current of the fuel injection valve shown in FIG. 4.
FIG. 7 shows a magnetic flux of an actuator with an electric current of the fuel injection valve shown in FIG. 4.
FIG. 8 shows a magnetic flux of an actuator with an electric current of the fuel injection valve shown in FIG. 4 without a second part.

In FIG. 6, the actuator 30 of the fuel injection valve 10 according to the invention is shown without an electric current but a magnetic flux 42 is generated due to the permanent magnet 64. As may be seen, the magnetic flux 42 has a saturation in the first part 62 in the area axially overlapping the second part 64 (on top of the second part 64 in FIG. 6).

FIG. 7 shows the actuator 30 of the fuel injection valve 10 according to the invention with an electric current. A high magnetic flux 42, generated by the energized coil 34 flows through the separation ring 48 in axial direction, creating a specific first magnetic force F1 on the armature 32.

In FIG. 8, the actuator 30 of the fuel injection valve 10 according to the invention, but without the second part 64—the permanent magnet—is shown for comparison purposes. The coil 34 is fed with the same electric current as in the case of FIG. 7. As may be seen the magnetic flux 42 through the armature 32 is reduced compared to the magnetic flux 42 through the armature 32 in case of the separation ring comprising the second part 64. This is due to parasitic flux leaking through the first part 62 which is not magnetically saturated in radial direction by the permanent magnetic second part 64. The second magnetic force F2, which is the magnetic force on the armature created in the present case, is reduced to 75% of the first magnetic force F1.

The invention is not limited to specific embodiments by the description on the basis of said exemplary embodiments but comprises any combination of elements of different embodiments. Moreover, the invention comprises any combination of claims and any combination of features disclosed by the claims.

What is claimed is:

1. A fuel injection valve for an internal combustion engine, comprising:
   a housing having a cavity that hydraulically connects a fluid inlet tube with a nozzle orifice,
   a valve needle movably positioned in the cavity to open and close the nozzle orifice,
   an actuator comprising a magnetic coil arranged in a coil casing and an armature movably positioned in the cavity, movable with respect to the coil and coil casing, and mechanically coupled to the valve needle to initiate a movement of the valve needle based on a magnetic flux initiated by the magnetic coil, the armature positioned on a first side of the magnetic coil opposite from the nozzle orifice positioned on a second side of the magnetic coil,
   wherein the housing comprises a separation ring having a first cylindrical outer surface with an outer diameter fixed against movement with respect to the coil casing and positioned between the armature and the coil casing and configured to lead the magnetic flux to the armature,
   wherein the separation ring comprises a first part with a recess in an axial face of the separation ring having a ring shape and a second part having a cylindrical shape matching the ring shape and arranged within the recess,
   wherein the first part is made of a first material and the second part is made of second material that differs from the first material, and
   wherein the first material and the second material are magnetic materials.

2. The fuel injection valve of claim 1, wherein the first material is a ferromagnetic material and the second material is a permanent magnetic material.

3. The fuel injection valve of claim 2, wherein the coil and the coil casing are hydraulically separated from the cavity by the housing and the first part of the separation ring, and the second part of the separation ring is arranged between the first part and the coil such that the first part hydraulically separates the second part from the cavity.

4. The fuel injection valve of claim 1, wherein the first material comprises at least one of Cr, C, Mn, Si, P, or S.

5. The fuel injection valve of claim 4, wherein the first material comprises at least one of the following elements in the following amount: 16-18% Cr, less than 0.12% C, less than 1% Mn, less than 1% Si, less than 0.04% P, or less than 0.03% S.

6. The fuel injection valve of claim 1, wherein the recess of the first part is positioned adjacent to the coil casing.

7. The fuel injection valve of claim 1, wherein the recess of the first part is positioned adjacent to the magnetic coil.

8. The fuel injection valve of claim 1, wherein the second part is magnetized radially.

9. The fuel injection valve of claim 1, wherein the recess of the first part comprises a circular groove.

10. A fuel injection assembly for an internal combustion engine, the fuel injection assembly comprising:
    a plurality of fuel injection valves, each fuel injection valve comprising:
    a housing having a cavity that hydraulically connects a fluid inlet tube with a nozzle orifice,
    a valve needle movably positioned in the cavity to open and close the nozzle orifice,
    an actuator comprising a magnetic coil arranged in a coil casing and an armature movably positioned in the cavity, movable with respect to the coil and the coil casing, and mechanically coupled to the valve needle to initiate a movement of the valve needle based on a magnetic flux initiated by the magnetic coil, the armature positioned on a first side of the magnetic coil opposite from the nozzle orifice positioned on a second side of the magnetic coil,
    wherein the housing comprises a separation ring having a first cylindrical outer surface with an outer diameter fixed against movement with respect to the coil casing and positioned between the armature and the coil casing and configured to lead the magnetic flux to the armature,
    wherein the separation ring comprises a first part with a recess in an axial face of the separation ring having a ring shape and a second part having a cylindrical shape matching the ring shape and arranged within the recess,
    wherein the first part is made of a first material and the second part is made of second material that differs from the first material, and
    wherein the first material and the second material are magnetic materials.

11. The fuel injection assembly of claim 10, wherein for each fuel injection valve, the first material is a ferromagnetic material and the second material is a permanent magnetic material.

12. The fuel injection assembly of claim 11, wherein for each fuel injection valve, the coil and the coil casing are hydraulically separated from the cavity by the housing and the first part of the separation ring, and the second part of the separation ring is arranged between the first part and the coil such that the first part hydraulically separates the second part from the cavity.

13. The fuel injection assembly of claim 10, wherein for each fuel injection valve, the first material comprises at least one of Cr, C, Mn, Si, P, or S.

14. The fuel injection assembly of claim 13, wherein for each fuel injection valve, the first material comprises at least one of the following elements in the following amount: 16-18% Cr, less than 0.12% C, less than 1% Mn, less than 1% Si, less than 0.04% P, or less than 0.03% S.

15. The fuel injection assembly of claim 10, wherein for each fuel injection valve, the recess of the first part is positioned adjacent to the coil casing.

16. The fuel injection assembly of claim 10, wherein for each fuel injection valve, the recess of the first part is positioned adjacent to the magnetic coil.

17. The fuel injection assembly of claim 10, wherein for each fuel injection valve, the second part is magnetized radially.

18. The fuel injection assembly of claim 10, wherein for each fuel injection valve, the recess of the first part comprises a circular groove.

19. The fuel injection valve of claim 1, wherein:
    the separation ring has a first right angle cylindrical shape, and
    ring shape of the recess of the first part of the separation ring comprises a second right angle cylindrical shape, and the cylindrical shape of the second part of the separation ring comprises a right angle cylindrical shape matching the second right angle cylindrical shape.

* * * * *